(12) United States Patent
Fiedler et al.

(10) Patent No.: US 10,320,189 B2
(45) Date of Patent: Jun. 11, 2019

(54) INPUT CIRCUIT FOR PROVIDING A SUPPLY VOLTAGE

(71) Applicant: Endress + Hauser GmbH + Co. KG, Maulburg (DE)

(72) Inventors: Marc Fiedler, Reinach (CH); Ralph Stib, Schonau (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 177 days.

(21) Appl. No.: 15/034,349

(22) PCT Filed: Nov. 3, 2014

(86) PCT No.: PCT/EP2014/073508
§ 371 (c)(1),
(2) Date: May 4, 2016

(87) PCT Pub. No.: WO2015/067544
PCT Pub. Date: May 14, 2015

(65) Prior Publication Data
US 2016/0294183 A1    Oct. 6, 2016

(30) Foreign Application Priority Data

Nov. 8, 2013   (DE) .......................  10 2013 112 300

(51) Int. Cl.
*H02J 9/06*    (2006.01)
*H02J 1/10*    (2006.01)
(Continued)

(52) U.S. Cl.
CPC ..................... *H02J 1/10* (2013.01);
*H02J 5/00* (2013.01); *H02J 7/34* (2013.01)

(58) Field of Classification Search
None
See application file for complete search history.

(56) References Cited

U.S. PATENT DOCUMENTS 4,415,964 A   11/1983  Scharfe
8,867,184 B2  10/2014  Kitchener et al.
(Continued)

FOREIGN PATENT DOCUMENTS

CN   101143676 A    6/2010
CN   102301293 A   12/2011
(Continued)

OTHER PUBLICATIONS

English Translation of International Preliminary Report on Patentability, WIPO, Geneva, dated May 19, 2016.
(Continued)

*Primary Examiner* — Cassandra F Cox
(74) *Attorney, Agent, or Firm* — Bacon & Thomas, PLLC

(57) ABSTRACT

An input circuit for providing a supply voltage, which input circuit has a first input on the input side, wherein the input circuit has at the output end an output which serves to connect an electronic unit. The supply voltage can be transmitted via the first input to the output of the input circuit, and the first input of the input circuit is connected via a first path to the output of the input circuit. In the first path a switching unit is provided which serves for connecting the first input to an auxiliary connection of the input circuit.

14 Claims, 2 Drawing Sheets

Figure 1:
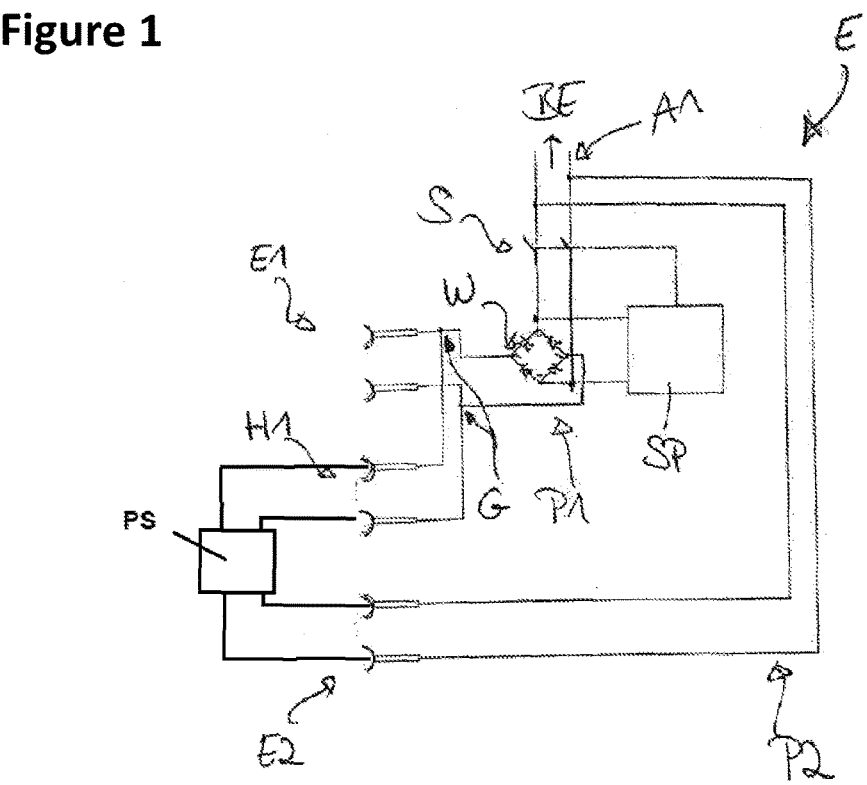

(51) Int. Cl.
*H02J 5/00* (2016.01)
*H02J 7/34* (2006.01)

(56) References Cited

U.S. PATENT DOCUMENTS

| | | | | |
|---|---|---|---|---|
| 9,276,404 | B2* | 3/2016 | Kayama | H02J 1/00 |
| 2012/0306276 | A1 | 12/2012 | Fiedler et al. | |
| 2012/0326517 | A1* | 12/2012 | Narwal | G06F 1/04 |
| | | | | 307/80 |
| 2013/0241295 | A1* | 9/2013 | Cheng | H02J 9/06 |
| | | | | 307/80 |
| 2013/0278222 | A1 | 10/2013 | Seller et al. | |
| 2014/0070609 | A1 | 3/2014 | Fiedler et al. | |

FOREIGN PATENT DOCUMENTS

| | | |
|---|---|---|
| CN | 102810975 A | 12/2012 |
| DE | 102010063783 A1 | 6/2012 |
| DE | 102011076706 A1 | 12/2012 |
| DE | 102011076708 A1 | 12/2012 |
| WO | 2008080667 A1 | 7/2008 |
| WO | 2010086606 A2 | 8/2010 |
| WO | 2012065620 A1 | 5/2012 |

OTHER PUBLICATIONS

International Search Report,, EPO, The Netherlands, dated Feb. 13, 2015.
German Search Report, German PTO, Munich, dated Jul. 2, 2014.
"Uninterruptible power supply with integrated power supply unit," TRIO—UPS/1AC/24DC/5, Sep. 1, 2009, http://media.digikey.com/pdf/DataSheets/Phoenix Contact PDFs/TRIO—UPS, 1AC,24DC,5.pdf, pp. 1-16.
"TRIO—UP5/1AC/24DC/5—Uninterruptible Power Supply With Integrated Power Supply Unit"; Data Sheet 104103_en_00; Phoenix Contact Inspiring Innovations; Phoenix Contact—Sep. 1, 2009.

* cited by examiner

INPUT CIRCUIT FOR PROVIDING A SUPPLY VOLTAGE

TECHNICAL FIELD

The invention relates to an input circuit for providing a supply voltage. Furthermore, the invention relates to the use of the input circuit, a field device, and a method for providing a power supply.

BACKGROUND DISCUSSION

Field devices, such as those marketed by Endress+Hauser, need a power supply for their operation. Such a power supply, e.g., in the form of a supply voltage, can nowadays be provided for the field devices in different ways. Thus, it has become known from the German patent application, DE 102011076708 A1 to supply a field device with electrical energy via a power supply unit. In addition to that, there is a possibility of supplying a field device with electrical energy from a fuel cell or a solar panel. It has also become known that field devices can be supplied with power via a so-called two-wire current loop.

Field devices thereby represent all process-oriented devices—i.e., those used in an industrial plant—such as, for example, display units, sensors, actuators, data loggers, or radio units.

However, one disadvantage of the known field devices lies in the fact that they are all designed for only one form of power supply mentioned above.

SUMMARY OF THE INVENTION

Thus, an object of the invention is based upon the aim of specifying a possibility of providing various ways to supply a field device with the required energy.

The object is achieved according to the invention by an input circuit, a field device, a method, as well as the use of the input circuit.

In relation to the input circuit, the object is achieved by an input circuit for providing a supply voltage, which input circuit has a first input on the input side, wherein the input circuit has at the output side an output, which serves to connect an electronic unit, wherein the supply voltage can be transmitted via the first input to the output of the input circuit, wherein the first input of the input circuit is connected via a first path to the output of the input circuit, wherein in the first path a switching unit is provided, which serves for connecting the first input to an auxiliary connection of the input circuit.

Preferably, the first switching unit thereby serves the purpose of electrically connecting the first input with the auxiliary connection or of redirecting at least a part of the electrical power introduced via the first input to the auxiliary connection of the input circuit.

Hence, the input circuit can serve the purpose of connecting the electronic unit to a power supply. The electronic unit can thus be connected via the input circuit to a power supply, which provides a supply voltage. The electronic unit is preferably an operating electronics, which serves the purpose of operating a device, e.g., a field device.

The input circuit is preferably arranged on a support element, e.g., a printed circuit board, which at least has connections in the form of the first input, the output, and the auxiliary connection. Thus, the first path can, for instance, consist of a conducting path that connects the first input with the output. Via an additional path, the auxiliary connection can be connected to the switching unit. This second path can also consist of a conducting path. Alternatively, one or more cables can also be provided, which connect the components mentioned above.

In one embodiment of the input circuit, the switching unit serves the purpose of interrupting the first path. By interrupting the first path, the connection between the first input and the output—and thus the power supply of the operating electronics via the first path—can be interrupted. In addition to that, a connection between the first input and the auxiliary connection can be provided. For this purpose, the switching unit is accordingly arranged in the first path.

In a further embodiment of the input circuit, the auxiliary connection serves the purpose of connecting a switching power supply. The auxiliary connection can, just like the first input or the output of the input circuit, have one or more contacts for connecting a switching power supply, a power supply, or the electronic unit. Alternatively, the output can be connected directly to the electronic unit, i.e., without the respective contacts. In such a case, the input circuit would have contacts for establishing a connection to the first input and to the auxiliary connection.

In a further embodiment of the input circuit, the input circuit has a second input on the input side, wherein the second input of the input circuit is connected to the output of the input circuit via a second path, wherein the supply voltage for operating the electronic unit can be transmitted via the first and/or the second input to the output of the input circuit. The second input can also have contacts for connections. The second path can, as described above, consist of a conducting path or a cable. Thus, via the switching unit, a supply voltage that is connected to the first input and is provided by an energy source can be made available via the second path at the output. The supply voltage that is introduced via the first input can thereby be made available at the output of the electronic unit partly via the first path, diverted via the auxiliary connection and via the second input, and finally via the second path.

In a further embodiment of the input circuit, there is a pickup on the first path, preferably arranged between the first input and the switching unit, via which at least a part of the electrical power that is introduced via the first input can be redirected, preferably to the auxiliary connection. The pickup provides an electrical contact, via which the first path is connected to the auxiliary connection.

In a second embodiment of the input circuit, the second input serves the purpose of receiving at least part of the electrical power, which has been redirected by the pickup at the first path via the auxiliary connection and preferably via the switching power supply.

In a second embodiment of the input circuit, the pickup serves the purpose of at least partly redirecting the introduced electrical power via the second input and/or the second path to the output of the input circuit.

In a further embodiment of the input circuit, the pickup serves the purpose of at least partly redirecting the electrical power that was introduced through the first input via the auxiliary connection, particularly preferred in the event that the switching unit has interrupted the first path.

In a second embodiment of the input circuit, there is a monitoring unit provided in the first path for monitoring the power or voltage, preferably between the first input and the switching unit. The monitoring unit can thus serve the purpose of monitoring the electrical power introduced via the first input. Respective voltage monitoring systems, e.g., in the form of a comparator circuit, are known to the expert.

In a further embodiment of the input circuit, the monitoring unit is configured such that in the event of a current or voltage being introduced via the first input that exceeds a preset threshold value, the first path is interrupted via the switching unit. Thus, in the event of the power supply outputting a supply voltage that does not have the required value needed for operating the electronic unit, the power can be conducted to the output via the second path.

In a further embodiment of the input circuit, the monitoring unit serves the purpose of piloting the switching unit. For this purpose, the monitoring unit can provide a corresponding output signal that serves the purpose of piloting the switching unit.

In a further embodiment of the input circuit, the first input of the input circuit serves the purpose of connecting a mains voltage or another energy source for power supply, such as, for example, a solar panel. Alternatively, the first input can also serve the purpose of connecting a battery unit.

In a further embodiment of the input circuit, the second input of the input circuit serves the purpose of connecting a switching power supply or a battery unit. Preferably, the second input serves the purpose of connecting only a switching power supply.

In relation to the field device, the aim is achieved by a field device with an input circuit according to one of the preceding embodiments. Thereby, the operating electronics can also comprise the input circuit. Hence, the input circuit can be an integral part of the operating electronics of the field device. Operational electronics thereby comprise all electronic units of a field device that serve to perform the functions and/or functionalities of the field device or are required for that purpose.

In one embodiment of the field device, the field device has a switching power supply that is arranged between the pickup on the first path and the second input of the input circuit. The switching power supply can be connected to the input circuit via the auxiliary connection and the second input. The switching power supply can thus be looped between the auxiliary connection and the second input.

In a second embodiment of the field device, the field device has a battery unit that is connected to the second input.

In a further embodiment of the field device, a connection for the first input of the input circuit is arranged outside the housing or on the housing of the field device, particularly in the form of a terminal.

In a further embodiment of the field device, a connection for the second input of the input circuit is arranged inside of a housing of the field device.

In relation to the method, the object is achieved by a method for providing a power supply, which power supply preferably serves the purpose of operating an electronic unit of the field device, wherein an input circuit is provided, which input circuit has a first input on the input side, wherein an electronic unit is supplied with electrical power via the input circuit, wherein, in the event that an electrical source is connected to the first input, the electronic unit (BE) is supplied with electrical power via a first path (P1) between the first input (E1) and the output (A1), wherein, in the event of the electrical power introduced via the first input (E1) exceeding a preset threshold value, the first input is connected to an auxiliary connection of the input circuit.

In one embodiment of the method, the input circuit has a second input, wherein in the event that an energy source is connected to the second input, the electronic unit is supplied with electrical power via a second path between the second input and the output.

In a further embodiment of the method, the first path is interrupted when the electrical power introduced via the first input exceeds a preset threshold value.

In relation to the use, the aim is achieved by the use of the input circuit according to one of the previously explained embodiments for providing a supply voltage for operating an electronic unit of a field device.

BREIF DESCRIPTION OF THE DRAWINGS

The invention is further explained by means of the following drawings. Illustrated are:

FIG. 1: is a schematic representation of an embodiment of an input circuit; and

Figure 2:
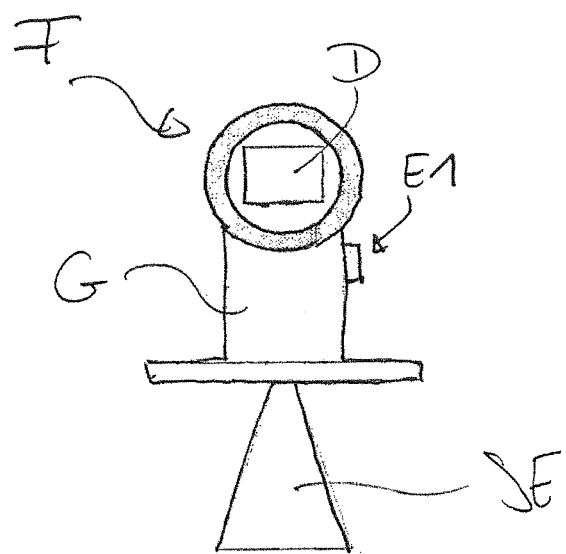

FIG. 2: is a schematic view of a field device.

DETAILED DISCUSSION IN CONJUCTION WITH THE DRAWINGS

FIG. 1 shows a schematic representation of an input circuit E having a first input E1 and a second input E2 as well as an output A1. In addition to that, the input circuit E has an auxiliary connection H1. The first input E1 is connected to the output A1 via a first path P1. The second input E2 is connected to the output A1 via a second path P2. The first and second path P1, P2 run in parallel between the first and the second input E1, E2 and the output A1. The auxiliary connection H1 is connected to the first Path P1 via a pickup G.

The pickup G is thereby arranged between the first input E1 and a rectifier W or a voltage control SP or a switching unit S.

The switching unit S can, for example, consist of a relay or of another component that serves the purpose of interrupting the first path P1. Alternatively, a transistor can also be provided, which regulates or controls the electrical power that is transmitted via the first path P1 to the output A1.

The first input E1, the second input E2, and the auxiliary connection H1 can be placed in contact via the respective contacting elements, such as, for example, terminals or plug-in contacts.

In the first path P1, the voltage control SP is arranged between the first input E1 and the output A1. For that purpose, a Wheatstone bridge, for example, can be provided.

Furthermore, the switching unit S is arranged between the voltage control SP or the pickup G on the first path P1 for the voltage control SP and the output A1. In the present example, the switching unit S consists of elements for interrupting the first path P1. Alternatively, as already described above, the interruption can occur only in part, so that the power or energy introduced via the first input E1 is redirected to the auxiliary connection H1. For tapping into this electrical power at the auxiliary connection H1, an appropriate pickup G in the first path is provided between the first input and the rectifier W or the voltage control SP.

The second input E2 of the input circuit E is connected to the output Al of the input circuit E via a second path P2. Preferably, as shown in FIG. 1, no further components are arranged in the second path P2 between the second input E2 and the output A1.

In a first operation mode, the input circuit E can then conduct electrical energy via the first path P1 to a downstream electronic unit BE, which can be connected to the output A1. For this purpose, a solar panel, for example, which issues a comparably low voltage of, for example, 24 V, can be connected to the first input E1.

On the other hand, in a second operation mode of the input circuit E, the first input E1 can be supplied with mains voltage—i.e., of approx. 220 V, for example. In such a case, the voltage control SP would detect the exceeding of a preset threshold value and interrupt the first path P1. For that purpose, the voltage control SP can issue a corresponding control signal to the switching unit S. The mains voltage would then be available at the auxiliary connection H1. Via this auxiliary connection H1 and a connected switching power supply (not shown), the mains voltage could then be transformed to the supply voltage that is required by the electronic unit BE. This supply voltage could then be output by the power supply via the second input E2 to the output A1 of the input circuit E.

In a third operation mode of the input circuit E, a battery unit (not shown) could be connected to the second input E2 of the input circuit E, and the electrical power that is output by the battery unit could be transmitted as supply voltage via the second path P2 to the output Al of the input circuit E.

FIG. 2 shows a schematic representation of a field device F with a first input arranged on the outside of the field device housing G. Alternatively, the first input E1 can be arranged outside of the housing G. The first input E1 is connected to the input circuit E that is shown in FIG. 1, or is part of the latter. While the first input E1 of the input circuit E is thus arranged on the outside of the housing G or outside the housing G, the second input E2 is arranged inside the housing G. The housing can, for example, be equipped with a chamber for receiving a battery unit and/or a switching power supply. Inside this chamber, the second input E2 and the auxiliary connection H1 of the input circuit E can then be arranged as well.

The field device F shown in FIG. 2 is equipped also with a display D for displaying, for example, measured values. In addition to that, the field device F shown in FIG. 2 is also equipped with a sensor element SE for establishing a process variable.

The invention claimed is:

1. An input circuit for providing a supply voltage, the input circuit having an input side and an output side, and comprising:
   a switching unit;
   an electronic unit;
   a monitoring unit;
   an auxiliary connection; a first input on said input side, said output side serves the purpose of connecting to said electronic unit; and
   a first path for monitoring the power or voltage between said first input and said switching unit, wherein:
   said monitoring unit is provided in said first path;
   the supply voltage can be transmitted via said first input to said output side of the input circuit;
   said first input is connected to said output side of the input circuit via a first path;
   in said first path, said switching unit is provided;
   said monitoring unit is configured such that in the event of a current or voltage being introduced via said first input that exceeds a preset threshold value, said first path is interrupted via said switching unit;
   there is a node on said first path arranged between said first input and said switching unit; and
   the node serves the purpose of at least partly redirecting the electrical power that was introduced through said first input via said auxiliary connection in the event that said switching unit has interrupted said first path.

2. The input circuit according to claim 1, wherein:
said auxiliary connection serves the purpose of connecting a switching power supply.

3. The input circuit according to claim 2, wherein:
the input circuit has a second input on the input side, wherein said second input is connected to the output of the input circuit via a second path; and
the supply voltage for operating said electronic unit can be transmitted via said first and/or said second input to said output of the input circuit.

4. The input circuit according to claim 2, wherein:
said second input serves the purpose of receiving at least part of the electrical power, which has been redirected by said node at said first path via said auxiliary connection and via said switching power supply.

5. The input circuit according to claim 1, wherein:
said monitoring unit serves the purpose of piloting said switching unit.

6. The input circuit according to claim 1, wherein:
said first input of the input circuit serves the purpose of connecting a mains voltage or some other kind of energy source for energy supply, such as, for example, a solar panel.

7. The input circuit according to claim 1, wherein:
said second input of the input circuit serves the purpose of connecting a switching power supply or a battery unit.

8. A field device with an input circuit as defined in claim 1.

9. The field device according to claim 8, wherein:
the field device has a switching power supply, which is arranged between said node on said first path and said second input of said input circuit.

10. The field device according to claim 8, wherein:
the field device has a battery unit, which is connected to the second input.

11. The field device according to claim 8, wherein:
the connection for said first input of said input circuit is arranged outside of said node or on said node of the field device, in the form of a terminal.

12. The field device according to claim 1, wherein:
the connection for said second input of said input circuit is arranged inside the said node of the field device.

13. The use of an input circuit as defined in claim 1 for providing a supply voltage for operating an electronic unit of a field device.

14. A method for providing an energy supply, which energy supply serves the purpose of operating an electronic unit of a field device, comprising the steps of:
   providing an input circuit, which has a first input on an input side of the input circuit;
   providing the electronic unit with an output on an output side; and
   supplying the electronic unit with electrical power via the input circuit, wherein:
   in the event of an energy supply having been connected to the first input, the electronic unit is supplied with the electrical power via a first path between the first input and the output; and
   in the event of the electrical power introduced via the first input exceeding a preset threshold value, the first input is connected to an auxiliary connection of the input circuit.

* * * * *